United States Patent [19]
Nishida et al.

[11] Patent Number: 5,260,830
[45] Date of Patent: Nov. 9, 1993

[54] THREE COLOR SEPARATION/SYNTHESIS MIRROR DEVICE

[75] Inventors: Masami Nishida; Masataka Izawa; Manabu Akagi; Masayuki Akiyama, all of Tokyo, Japan

[73] Assignee: Pioneer Electronic Corporation, Tokyo, Japan

[21] Appl. No.: 960,731

[22] Filed: Oct. 14, 1992

[30] Foreign Application Priority Data

Oct. 22, 1991 [JP] Japan .................. 3-274339

[51] Int. Cl.⁵ .................. G02B 27/10; G02B 5/06
[52] U.S. Cl. .................. 359/634; 359/638; 359/601; 359/614; 359/589; 359/837
[58] Field of Search .............. 359/634, 637, 601, 614, 359/613, 638, 583, 837, 833

[56] References Cited

U.S. PATENT DOCUMENTS

| | | | |
|---|---|---|---|
| 2,737,076 | 3/1956 | Rock | 359/634 |
| 4,913,528 | 4/1990 | Hasegawa | 359/638 |
| 5,042,912 | 8/1991 | Sato et al. | 359/601 |

*Primary Examiner*—Jon W. Henry
*Attorney, Agent, or Firm*—Kane, Dalsimer, Sullivan, Kurucz, Levy, Eisele and Richard

[57] ABSTRACT

A three color separation/synthesis mirror device for a liquid crystal projector comprises four dichroic mirrors whose joint part has a V-shaped notch in which a higher refractive index is filled thereby to eliminate stray lights. The device may have a prism at the joint part for causing an emitted light to be parallel with an incident light.

9 Claims, 13 Drawing Sheets

THREE COLOR SEPARATION/SYNTHESIS MIRROR DEVICE

BACKGROUND OF THE INVENTION

The present invention relates to a dichroic mirror device to separate or synthesize a red light (R), a green light (G) and a blue light (B), which are used for a projector such as a liquid crystal projector.

Liquid crystal projectors, CRT projectors and CCD cameras are accommodated in rear projection televisions, front projection televisions or television cameras. Liquid crystal panels used for the above colored lights R, G or B or projectors employing a CRT require a mechanism to separate or synthesize lights. A conventional device for light separation/synthesis uses a glass prism. However, the glass prism is actually used only for 1- to 2-inch liquid crystal panels. If employing a glass prism for a larger liquid crystal panel or a CRT, the glass prism has to be very large and thus it will cost a lot of money. Furthermore, there may arise the problem of retardation (irregular phase difference), when a large glass prism is used.

Figure 13:
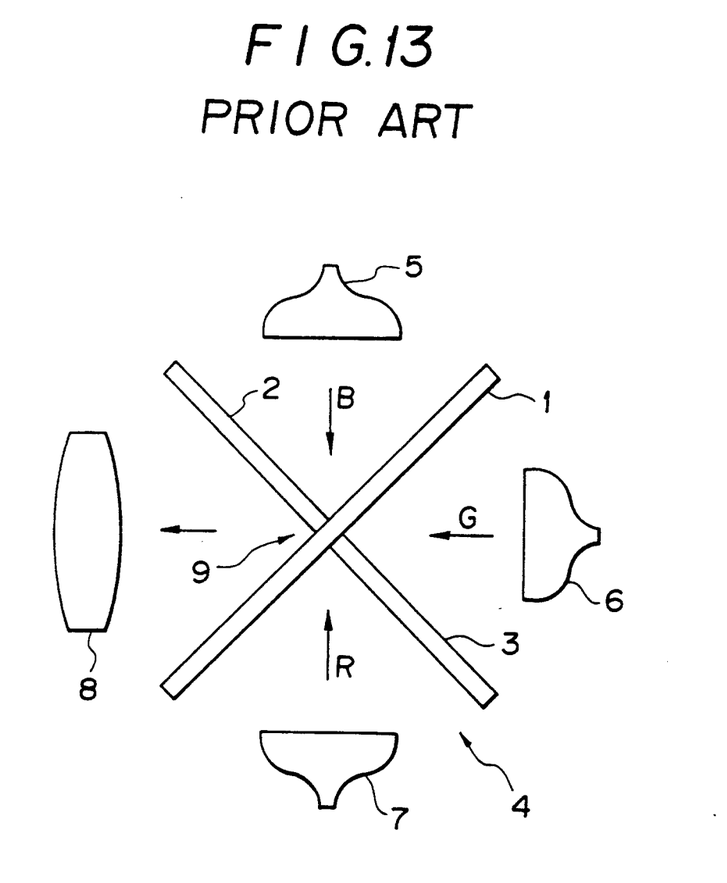
FIG. 13 is a schematic view showing the structure of a conventional cross-type three color separation/synthesis mirror device.

Another conventional device has then been proposed, which uses three dichroic mirrors instead of a glass prism. FIG. 13 shows a so-called conventional cross-type three color separation/synthesis mirror device 4. The device comprises a dichroic mirror 1 and two other dichroic mirrors 2 and 3 holding the mirror 1 therebetween, which forms an X-shape. A blue light B is emitted from a CRT 5, a green light G from a CRT 6 and a red light R from a CRT 7, respectively. Those three colored lights are synthesized by the separation/synthesis mirror device 4, pass through a lens 8 and are projected to the screen (not shown in the figure) to form an image.

However, a light passing through the joint portion 9 goes along a different path from that of a light passing through other portions of the device, which affects the image quality. For instance, a double image appears around the center of the screen, the image gets blurred or it lacks clearness, resulting in decrease in number of scanning lines.

The other problem is an out-of-focus image and a decline in image contrast caused by an increase in the astigmatism. The astigmatism increases because the dichroic mirrors 1 to 3 are placed obliquely to the CRT's 5 to 7.

SUMMARY OF THE INVENTION

The object of the present invention is to solve the problems of the conventional devices described above by providing a three color separation/synthesis mirror device which notably improves the image quality.

According to one aspect of this invention, there is provided a three color separation/synthesis mirror device for projectors which comprises a housing, four dichroic mirrors which cross each other forming an X-shape within the housing, a V-shaped notch at the joint portion of two of the above dichroic mirrors and a transparent adhesive with a higher refractive index than that of the dichroic mirrors to fill the notch.

According to another aspect of this invention, there is provided a three color separation/synthesis mirror device for projectors which comprises a housing, four dichroic mirrors which cross each other forming an X-shape within the housing and a first correction prism fitted in the corner of the joint portion of the dichroic mirrors on light incident side. The first correction prism causes an emitted light to parallel the incident light.

It is desirable that the above three color separation/synthesis mirror device with the correction prism has a second correction prism adjacent to the first correction prism. The second correction prism aligns the path of an emitted light with that of the incident light.

According to this invention, the adhesive filled in the notch at the joint portion has a higher refractive index than that of dichroic mirrors, so that a light having entered the adhesive repeats total reflection at the boundaries between the adhesive and the dichroic mirrors, gradually fades and do not go out as a stray ray.

The first correction prism refracts an incident light so that, after passing through the dichroic mirror, the light is emitted in parallel to the incident light.

BRIEF DESCRIPTION OF THE DRAWINGS

In the accompanying drawings, FIGS. 1 to 8 are drawings to illustrate a first embodiment of the present invention, in which:

FIG. 8 is a view similar to FIG. 7, without the adhesive filled in.

FIGS. 9 to 11 are views illustrating a second embodiment of the present invention, in which:

DESCRIPTION OF THE PREFERRED EMBODIMENTS

The three color separation/synthesis mirror device according to this invention will now be explained with reference to FIGS. 1 to 12.

FIRST EMBODIMENT

Figure 1:
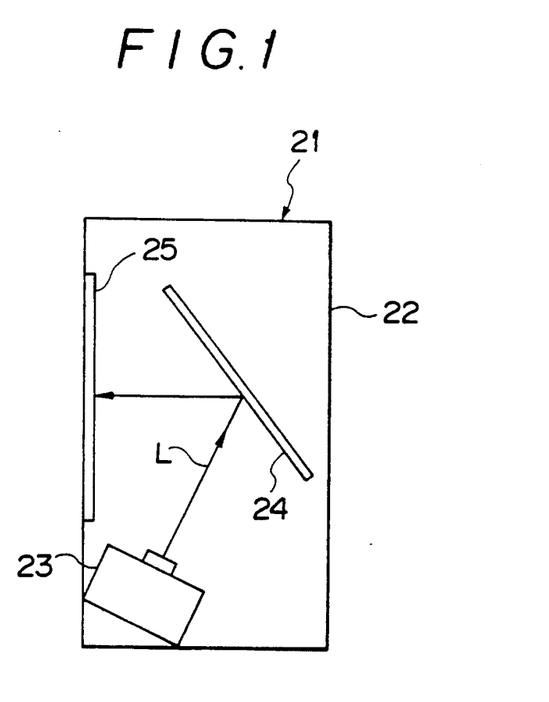
FIG. 1 is a schematic side view showing the structure of a projection television.
Figure 2:
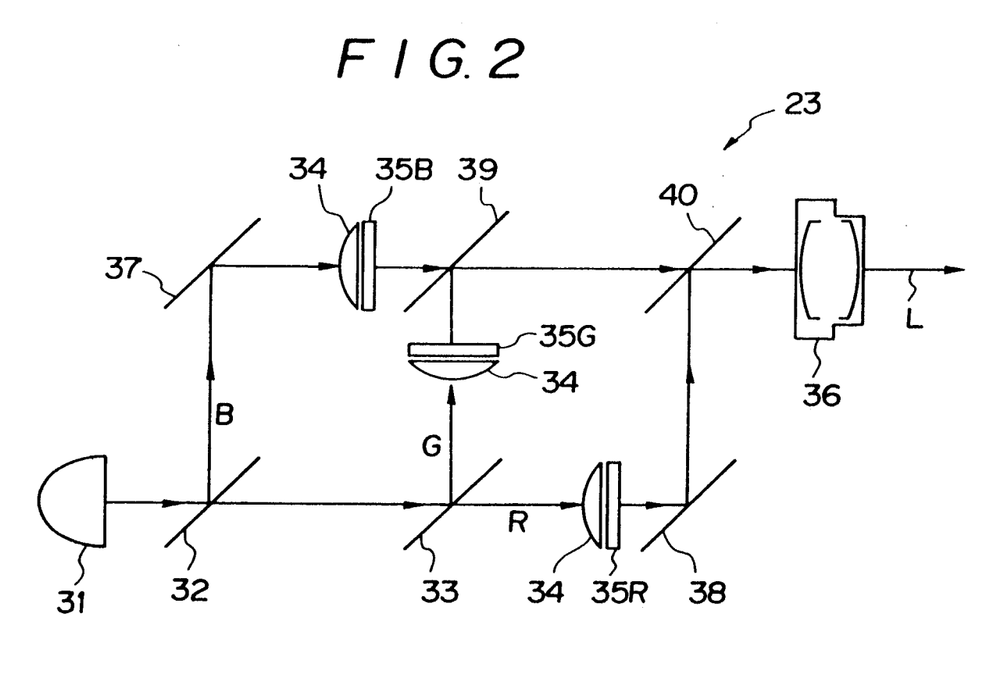
FIG. 2 is an explanatory view showing a principle of a liquid crystal projector.
Figure 3:
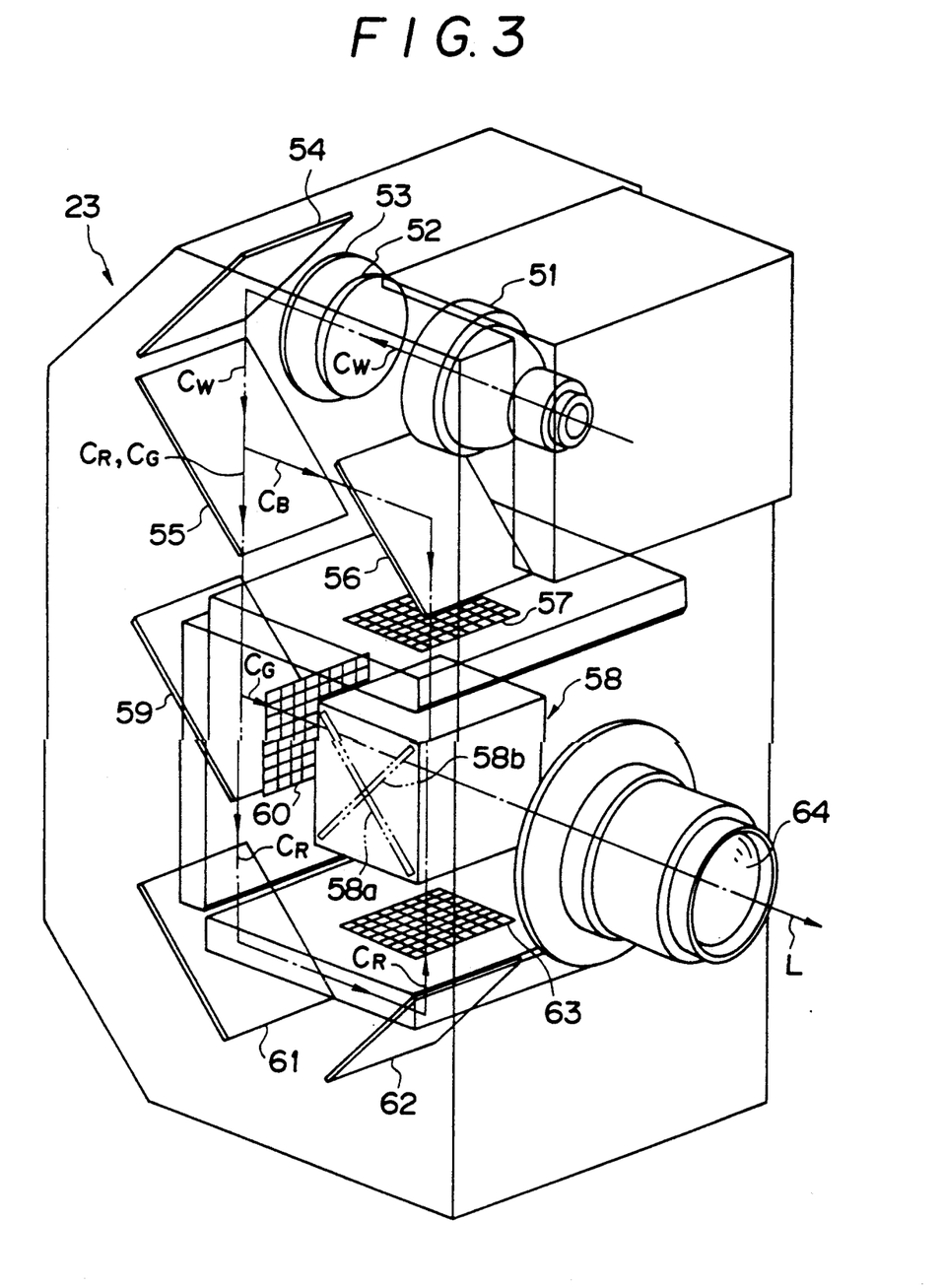
FIG. 3 is a perspective view showing the internal of a liquid crystal projector.

FIGS. 1 to 3 show a rear projection television 21 fitted with a liquid crystal projector 23. The liquid crystal projector 23 has separate liquid crystals for a red light (R), a green light (G) and a blue light (B), together with a projection lens to project a colored light (L).

As shown in FIG. 1, the liquid crystal projector 23 is accommodated in the housing 22 of the rear projection television 21 and emits a colored light (L). The colored light (L) emitted from the projector 23 is reflected by a total reflection mirror 24 placed obliquely in the housing 22, and is projected to the rear surface of the screen 25 fitted on the front surface of the housing 22. The screen 25 consists of a Fresnel lens and a lenticular lens. The projected light, then, forms a color image on the front surface of the screen 25.

FIGS. 2 and 3 illustrate the structure of the liquid crystal projector 23, and FIG. 2 shows the principle of the projector 23. As shown in FIG. 2, a condensing reflector 31 condenses light to emit a white light which is separated into three colored lights of a red light (R), a green light (G) and a blue light (B) through dichroic mirrors 32 and 33. The R, G and B lights, then, pass through a condenser lenses 34 to go into liquid crystal panels 35R, 35G and 35B, respectively. The transmittance of the liquid crystal panels 35R, 35G and 35B changes according to image signals either to transmit or to cut off the R, G and B lights. And, transmitted lights are projected by a projection lens 36, as a colored light (L). In FIG. 2, the reference numbers 37 and 38 represent total reflection mirrors, and the reference numbers 39 and 40 represent dichroic mirrors.

FIG. 3 illustrates a concrete internal construction of the liquid crystal projector 23. As shown in FIG. 3, a condensing reflector 51 with a tungsten-halogen lamp, a metal-halide lamp or the like as its light source projects a white light $C_W$. The white light $C_W$ goes through filters 52 and 53, which eliminate ultraviolet and infrared rays, and is reflected by a total reflection mirror 54. Of the white light $C_W$, a red light $C_R$ and a green light $C_G$ pass through a dichroic mirror 55, while a blue light $C_B$ is reflected thereby. The blue light $C_B$, then, is reflected by a total reflection mirror 56 and passes through a liquid crystal panel 57, as the transmission factor of the liquid crystal panel is altered. The blue light $C_B$ now enters the three color separation/synthesis mirror device 58. A dichroic mirror 58a of the three color separation/synthesis mirror device 58 only reflects a blue light $C_B$ and transmits the other two colored lights, $C_R$ and $C_G$, whereas another dichroic mirror 58b only reflects a red light $C_R$ and transmits the other two colored lights $C_G$ and $C_B$. The blue light $C_B$, therefore, enters a projection lens 64 after being reflected by the dichroic mirror 58a.

Between the red light $C_R$ and green light $C_G$ transmitted by the dichroic mirror 55, the green light $C_G$ is reflected by a dichroic mirror 59 and the red light $C_R$ is transmitted. The green light $C_G$, then, goes through a liquid crystal panel 60, as the transmission factor of the liquid crystal panel is altered. After passing the liquid crystal panel 60, the green light $C_G$ passes straight through the three color separation/synthesis mirror device 58 to the projection lens 4. The red light $C_R$, transmitted by the dichroic mirror 59, is reflected by total reflection mirrors 61 and 62, and passes through a liquid crystal panel 63, as the transmittance of the panel 63 is altered. The red light $C_R$ now enters the three color separation/synthesis mirror device 58, in which the red light is reflected by the dichroic mirror 58b, and reaches the projection lens 64. In this way, the projection lens 64 projects a light (L) including the three colored lights (R, G, B).

Figure 4:
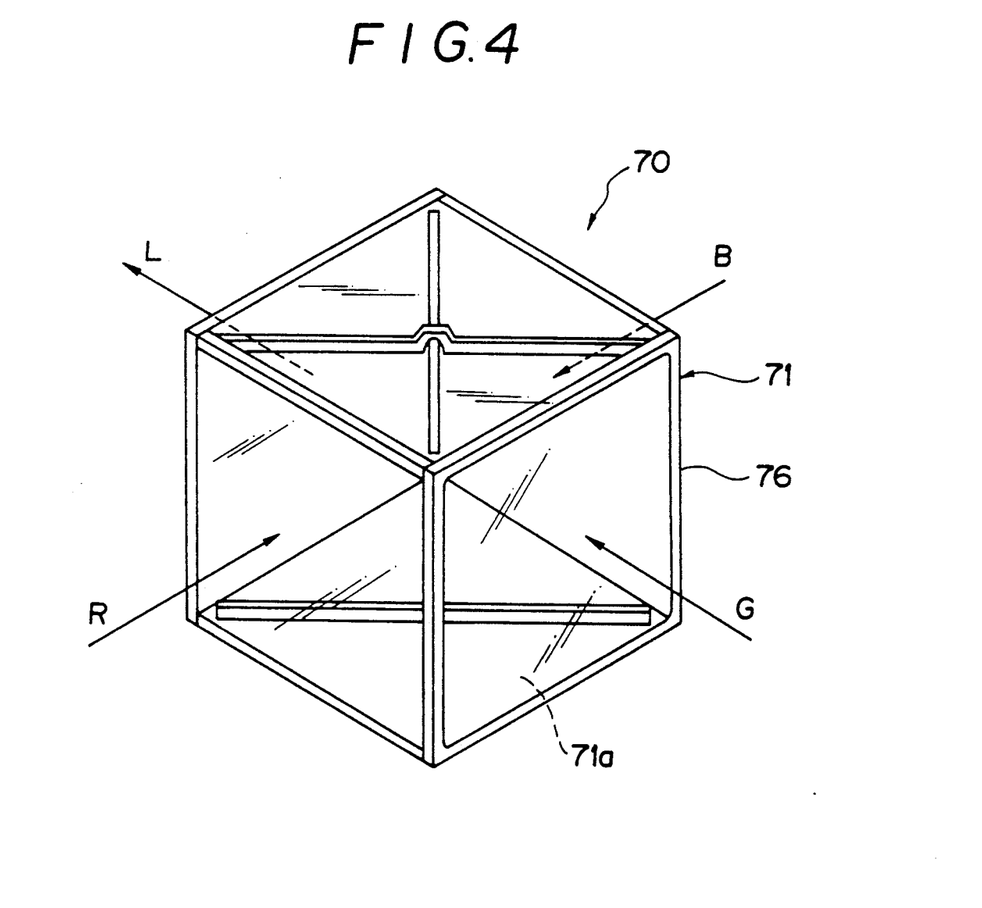
FIG. 4 is a perspective view showing the construction of the section of the three color separation/synthesis mirror device according to the first embodiment of the present invention.
Figure 5:
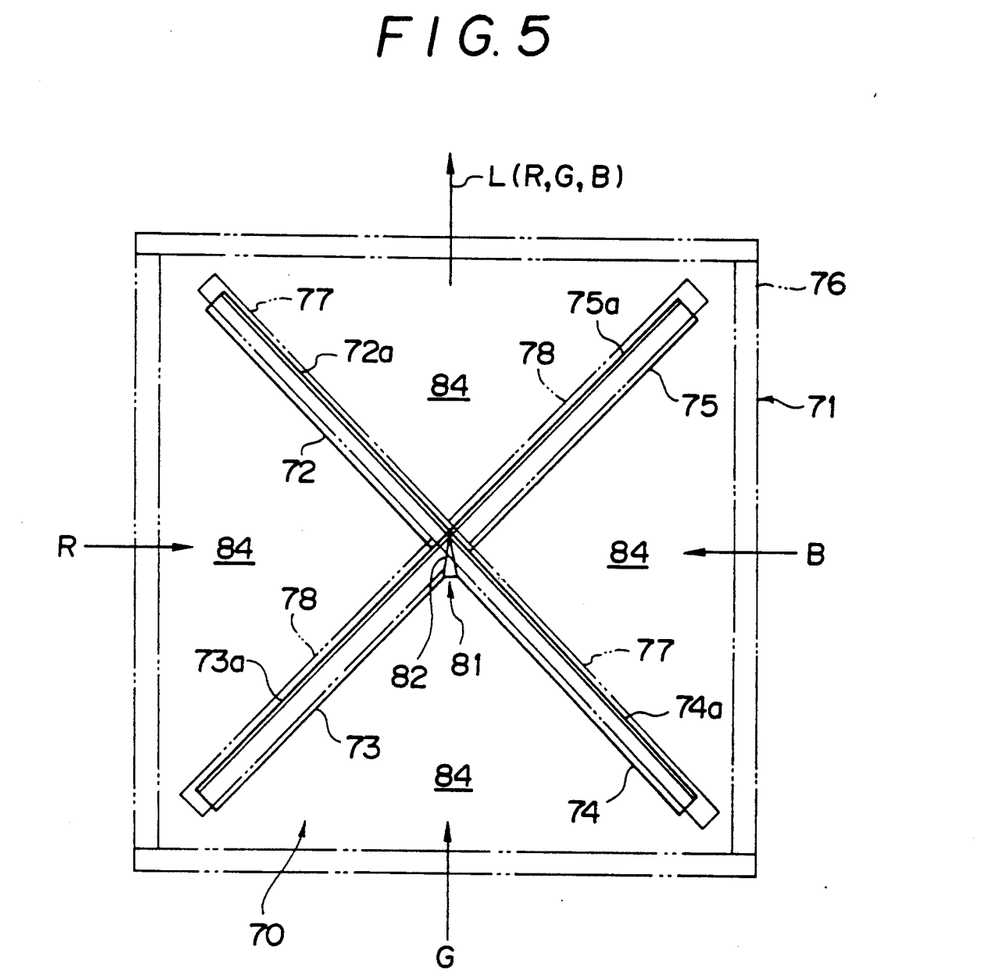
FIG. 5 is a top view of the mirror section shown in FIG. 4.
Figure 6:
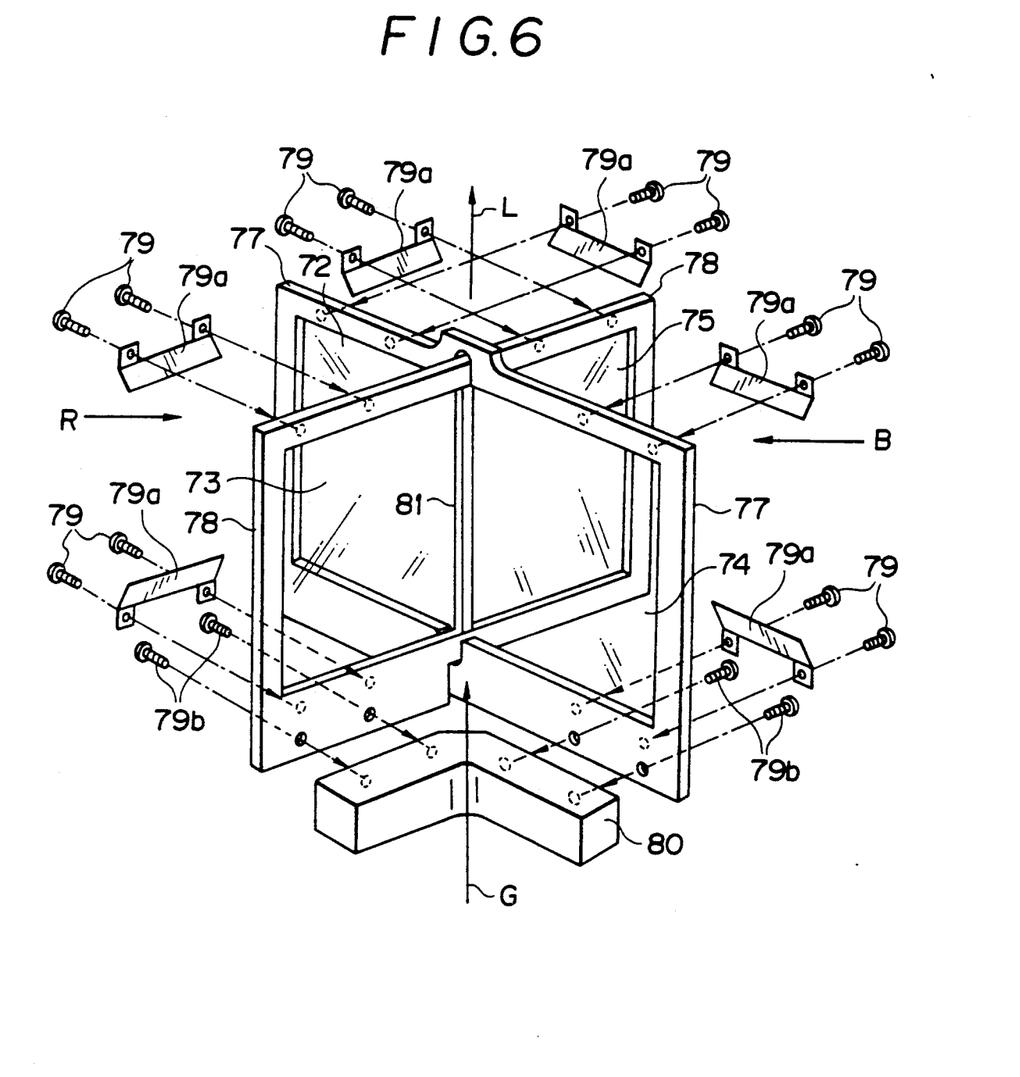
FIG. 6 is a perspective view of the mirror section shown in FIG. 4, with the framework removed.

FIGS. 4 to 6 show the construction of the three color separation/synthesis mirror device (the same as the three color separation/synthesis mirror device 58 shown in FIG. 3) in relation to the first embodiment. As shown in FIGS. 4 to 6, four dichroic mirrors 72 to 75 are installed along the diagonal lines of a cuboid or cubic housing 71 inside thereof. The dichroic mirrors 72 to 75 cross each other at right angles forming an X-shape. The housing 71 is made of glass plates of a high transparency except the bottom plate 71a. The glass plates are supported by a framework 76 to which the bottom plate 71a is fixed, so that the housing 71 forms a sealed structure.

As shown in FIG. 5, each of dichroic mirrors 72 to 75 have dichroic mirror surfaces 72a, 73a, 74a and 75a, respectively. A pair of dichroic mirrors 72 and 74, placed in alignment, are held together in a first rectangular guide frame 77 via holding springs 79a fastened by a plurality of screws 79. These two dichroic mirrors 72 and 74 abut against each other at the center portion of the guide frame 77. The other pair of dichroic mirrors 73 and 75 in alignment are likewise held in a second guide frame 78 via mirror holding springs 79a by a plurality of screws 79, and the two dichroic mirrors abut against each other at the center portion of the guide frame 78. The second guide frame 78 is cross-inserted into the first guide frame 77 at a right angle. Each lower portion of the guide frames 77 and 78 is fastened on a supporting base 80 by a plurality of screws 79b. The supporting base 80 is fitted on the bottom plate 71a of the housing 71.

Figure 7:
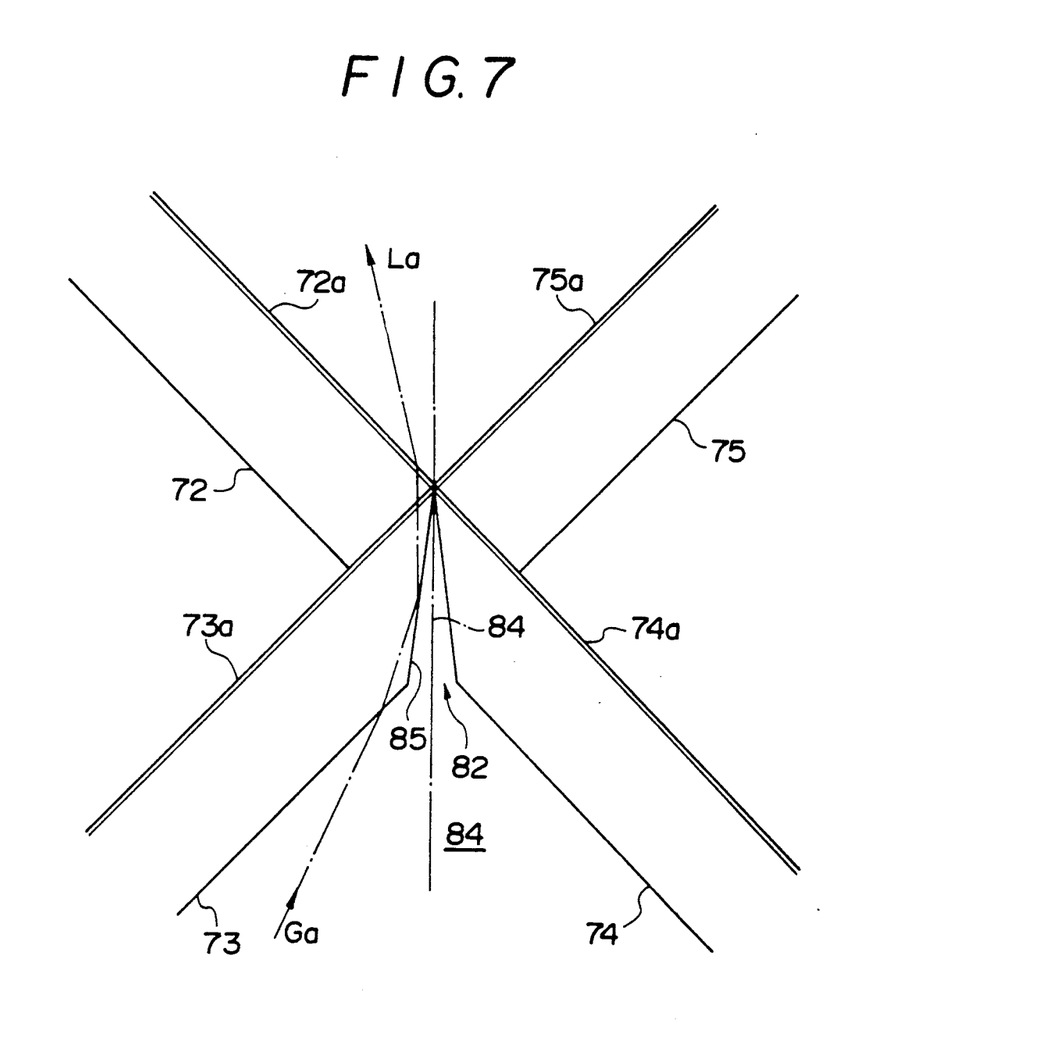
FIG. 7 is an enlarged top view of the joint of the mirror section in FIG. 5, in which the joint is filled with an adhesive.

As shown in FIGS. 4 and 5, colored lights R, G and B enter the three color separation/synthesis mirror device 70 which synthesizes those lights and emits a colored light L. In FIGS. 5 and 7, the joint 81 of the dichroic mirrors 73 and 74, which receive the green light G, has a V-shaped notch 82. The joint portion of the dichroic mirrors 73 and 74 is cut obliquely to form a space having the shape of a knife edge. Such a structure is made to continue the dichroic surfaces (coated surfaces) so as to minimize influence on image quality. If the dichroic surfaces are not continued, the image becomes partially colorless. To enhance the effect, the notch 82 is filled with a transparent adhesive to be hardened by ultraviolet rays, which provides a higher refractive index than the dichroic mirrors 72, 73, 74 and 75 made of glass (see FIG. 8). As the liquid adhesive 83 infiltrates into the notch 82 due to a capillary action, it is easy to fill the notch 82 with the adhesive. The housing 71 is filled with mixed liquid 84 of glycerine and ethylene glycol, to shorten the optical distance. All the materials are to be selected so that their refractive indexes satisfy the following formula;

$$n_p \geq n_g \geq n_l$$

wherein the refractive index of the dichroic mirrors 72 to 75 is $n_g$, the refractive index of the mixed liquid 84 is $n_l$ and the refractive index of the adhesive 83 is $n_p$. One of the preferred examples is to use glass with $n_g = 1.519$ for the dichroic mirror 72 to 75, liquid with $n_l = 1.44$ to 1.45 as the mixed liquid 84 and Lightweld 985 (made by TOYO INK MANUFACTURING CO., LTD.) with $n_p = 1.57$ as the adhesive 83.

It is desirable that all the colored lights, R, G and B enter the three color separation/synthesis mirror device as perfect parallel rays, condensed bundle of rays or divergent bundle of rays. However, some of the rays actually enter in a slanted direction. As shown in FIG. 7, when the notch 82 is not filled with the adhesive, it is filled with the mixed liquid 84 instead. The refractive index $n_g$ of the dichroic mirrors 73 and 74 is greater than the refractive index $n_l$ of the mixed liquid 84. In this case, a ray of light $G_a$ coming in a slanted direction is reflected totally at Brewster angle by a facet 85 of the notch 82 and goes out as a stray ray $L_a$. The stray ray $L_a$ causes a ghost image around the center of the screen and deteriorates the image quality.

Figure 8:
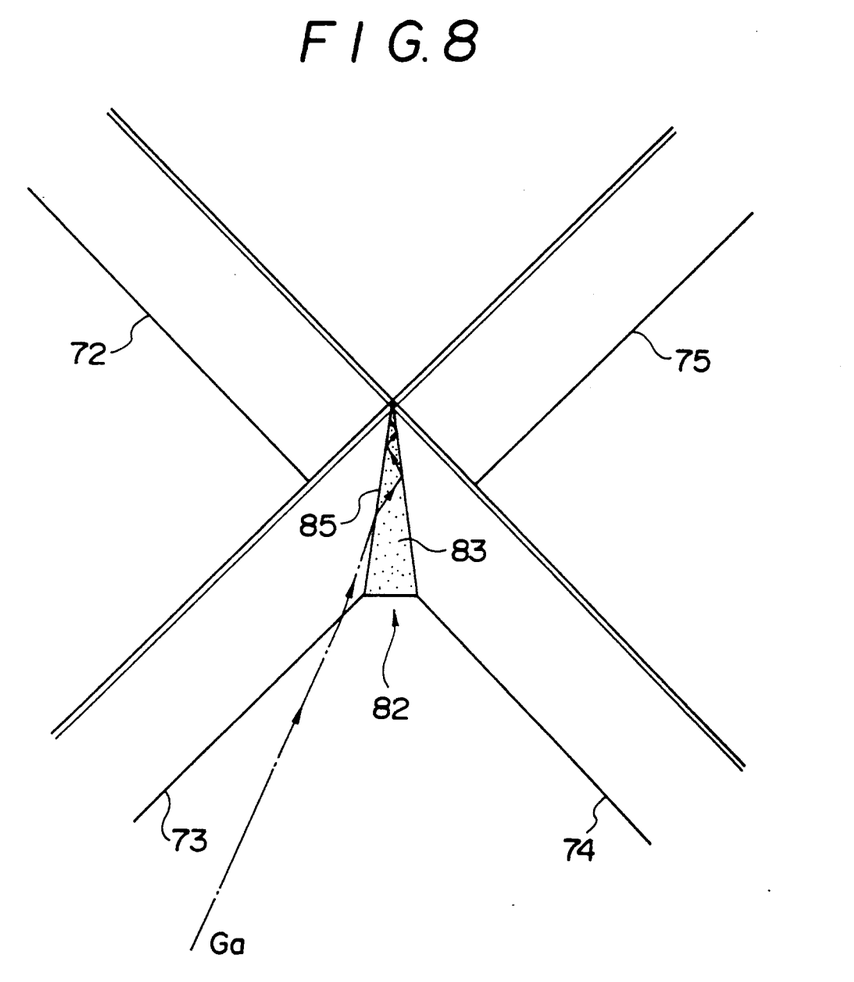

To avoid the ghost images, as shown in FIG. 8, the notch 82 is filled with the above mentioned adhesive 83 in this invention. The refractive index $n_g$ of the dichroic mirrors is smaller than the $n_p$ of the adhesive 83. With the adhesive filled in, therefore, the ray of light $G_a$ is refracted at the facet 85 and goes into the adhesive 83. Within the adhesive 83, the ray $G_a$ repeats total reflection at Brewster angle, gradually fades and finally goes extinct, since the adhesive functions as a photo wave guide. The ray $G_a$, therefore, will not go out as a stray ray.

As mentioned above, the V-shaped notch 82 at the joint portion 81 of the dichroic mirrors of this embodiment forms the dichroic surfaces continuously, so that the image quality is not affected, unlike a conventional similar device of which dichroic surfaces are discontinued.

Furthermore, positioning of the dichroic mirrors 72 to 75 is adjusted precisely, because the dichroic mirrors 72 to 75 are supported by the first and second guide frames 77 and 78.

Further, the mixed liquid 84 filling the housing 71 shortens the optical distance and thus brightens the image, compared with a conventional similar device with air therein instead of the liquid. The mixed liquid also is useful in that it lowers the temperature of the inside of the device due to a liquid cooling effect, which keeps small the difference in temperature between dichroic mirrors and therefore prevent fluctuations in their refractive indexes.

SECOND EMBODIMENT

A second embodiment of this invention will be explained with reference to FIGS. 9 to 11.

Figure 9:
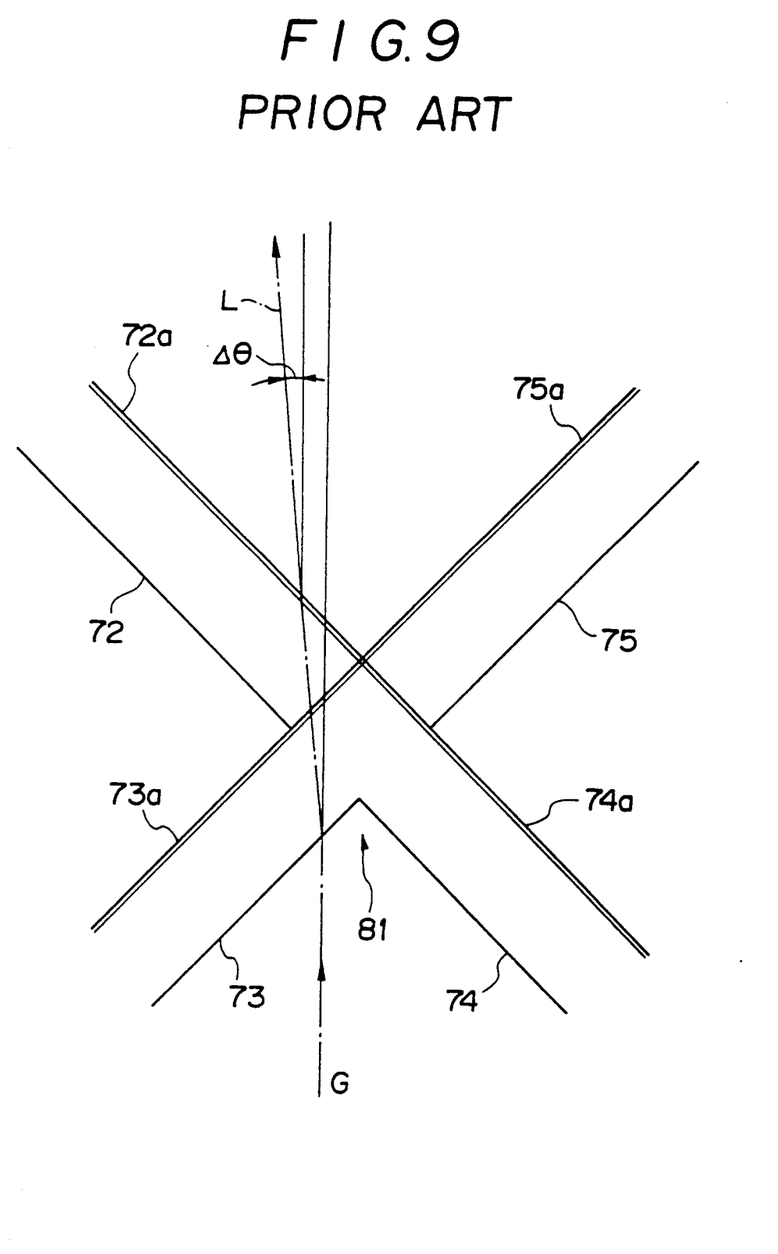
FIG. 9 is an enlarged top view of the joint portion of conventional dichroic mirrors.
Figure 10:
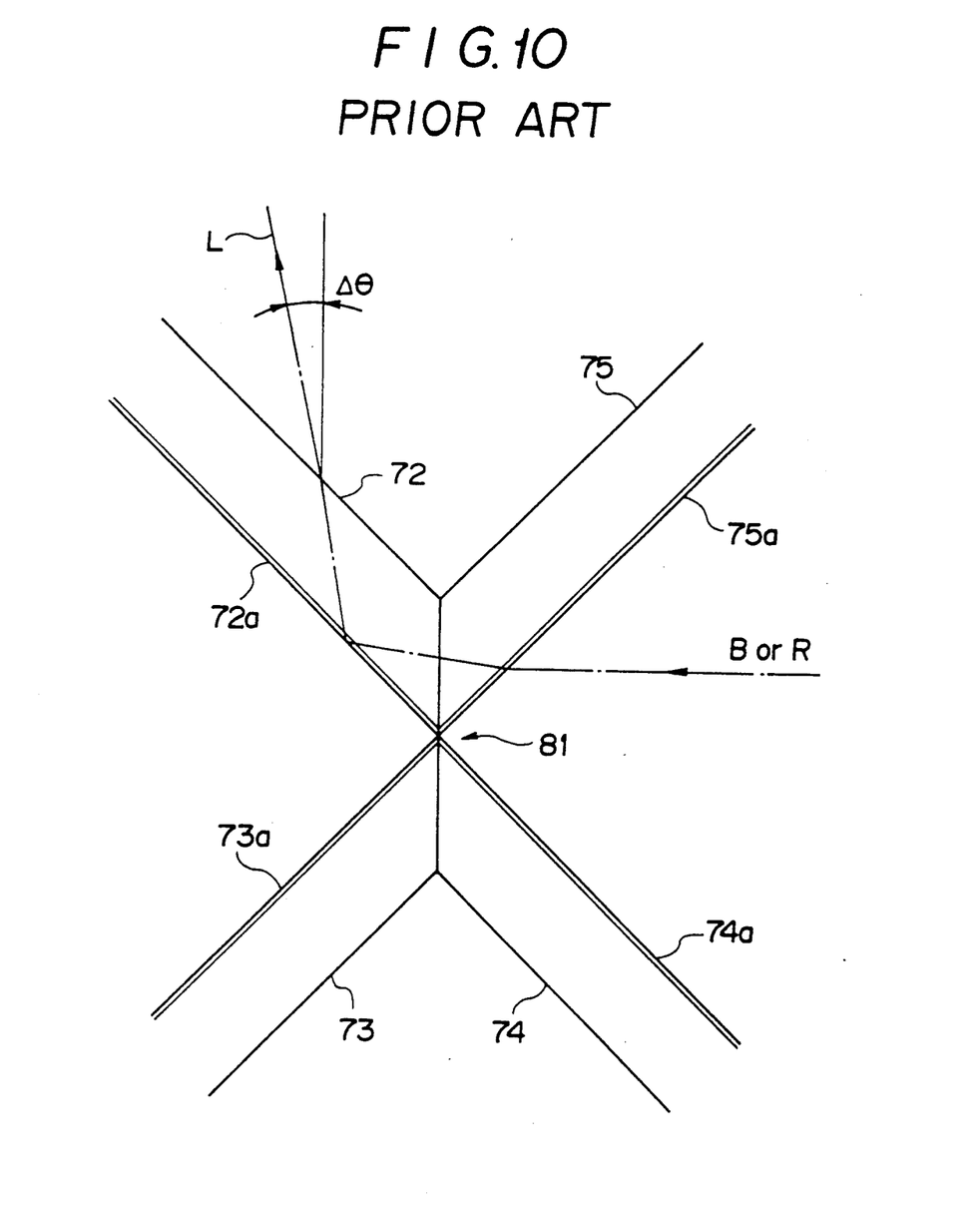
FIG. 10 is an enlarged top view showing another prior art.
Figure 11:
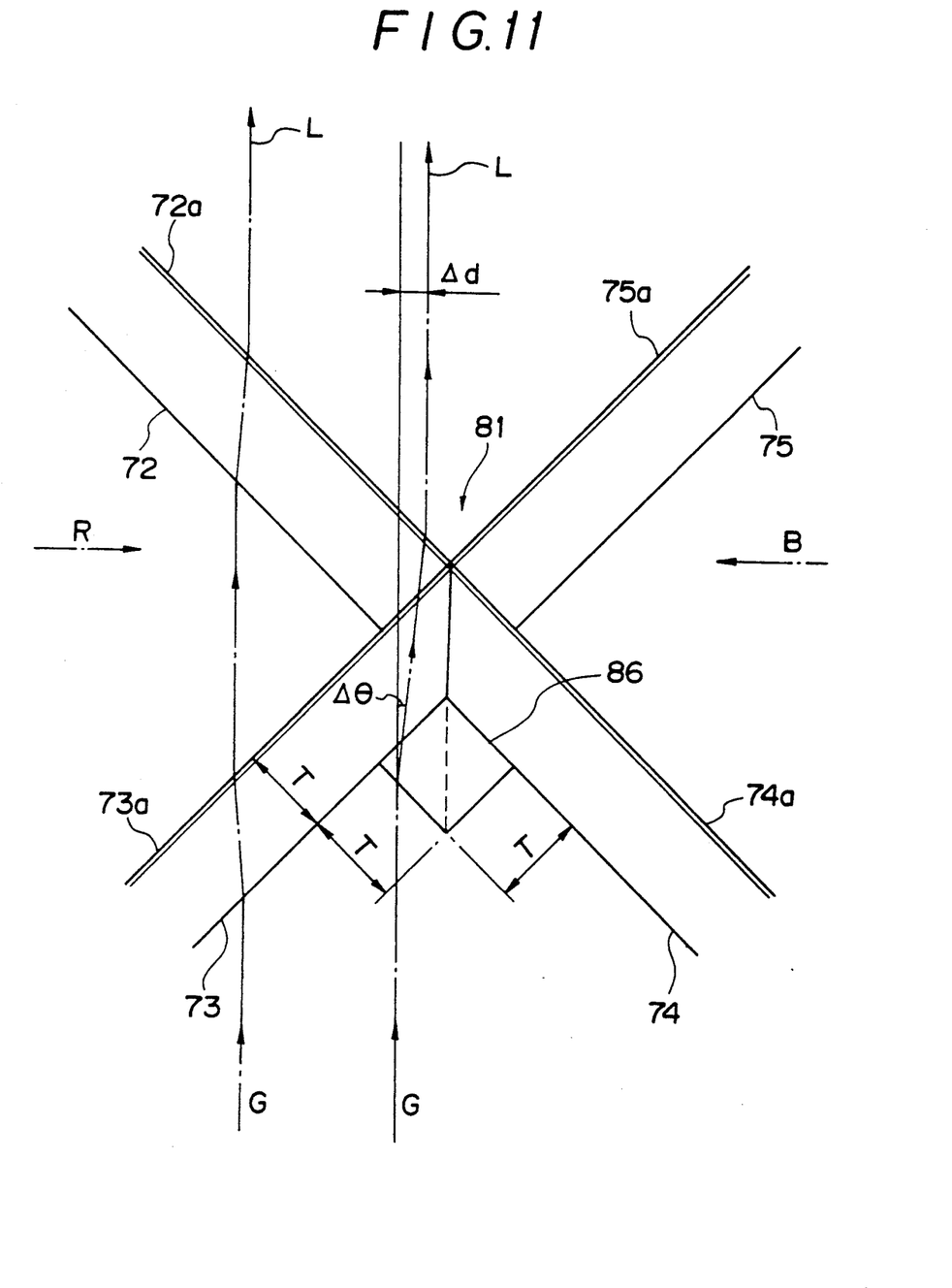
FIG. 11 is an enlarged top view of the joint of dichroic mirrors illustrating the second embodiment.

FIGS. 9 to 11 are enlarged top views of the joint portion 81 of various forms of the dichroic mirrors 72 to 75. The structure of the three color separation/synthesis mirror device of this embodiment is the same as the first embodiment except the joint portion 81. FIG. 11 shows the distinct feature of this embodiment, that is, a first correction prism 86 in the corner of the joint portion on the incident side of a green light G. Therefore the three color separation/synthesis mirror device comprises the housing 71 (see FIG. 5), four dichroic mirrors 72, 73, 74 and 75 which are installed inside of the housing 71 and cross each other at right angles forming an X-shape, and the correction prism 86. The correction prism 86 makes an emitted light L parallel to the incident light. The horizontal section shown in the FIG. 11, of the first correction prism 86 forms a square of which each side is the same as the thickness T of each of the dichroic mirrors. The correction prism 86 is a square pillar which is long in the perpendicular direction to the horizontal square section. The material and refractive index of the correction prism 86 are the same as the dichroic mirrors 73 and 74 of which the prism is fixed with adhesive in the right-angled corner.

FIGS. 9 and 10 show the structure of conventional devices. With those conventional structures, a light G (or a light B or R) having entered the joint 81 is refracted so that the light L is emitted at an angle of $\Delta\theta$ (for instance, 8° to 10°) to the path of the respective incident lights. The light L, then, causes a ghost image about the center of the screen. For example, a colored light having entered the dichroic mirror 73 goes slightly outward due to a difference in refractive index, and it is emitted out of the dichroic mirror 72 deviating at an angle of $\Delta\theta$ from a parallel line to the incident light. The deviate angle becomes great and causes a stray ray, when a colored light enters the dichroic mirrors 73 and 74 at an angle of slightly more or less than 45°.

As shown in FIG. 11, the device of this embodiment has the first correction prism 86 in the corner of the joint portion and the prism 86 directs the light L in an opposite direction to a conventional direction by an angle of $\Delta\theta$. As a result, the emitted light L goes parallel to the incident light G with a very small distance of $\Delta d$ deviated to the right in FIG. 11. Therefore, the light L does not include any oblique rays, and thus the problem of a ghost image appearing around the center of the screen is resolved according to the device of this embodiment.

THIRD EMBODIMENT

Figure 12:
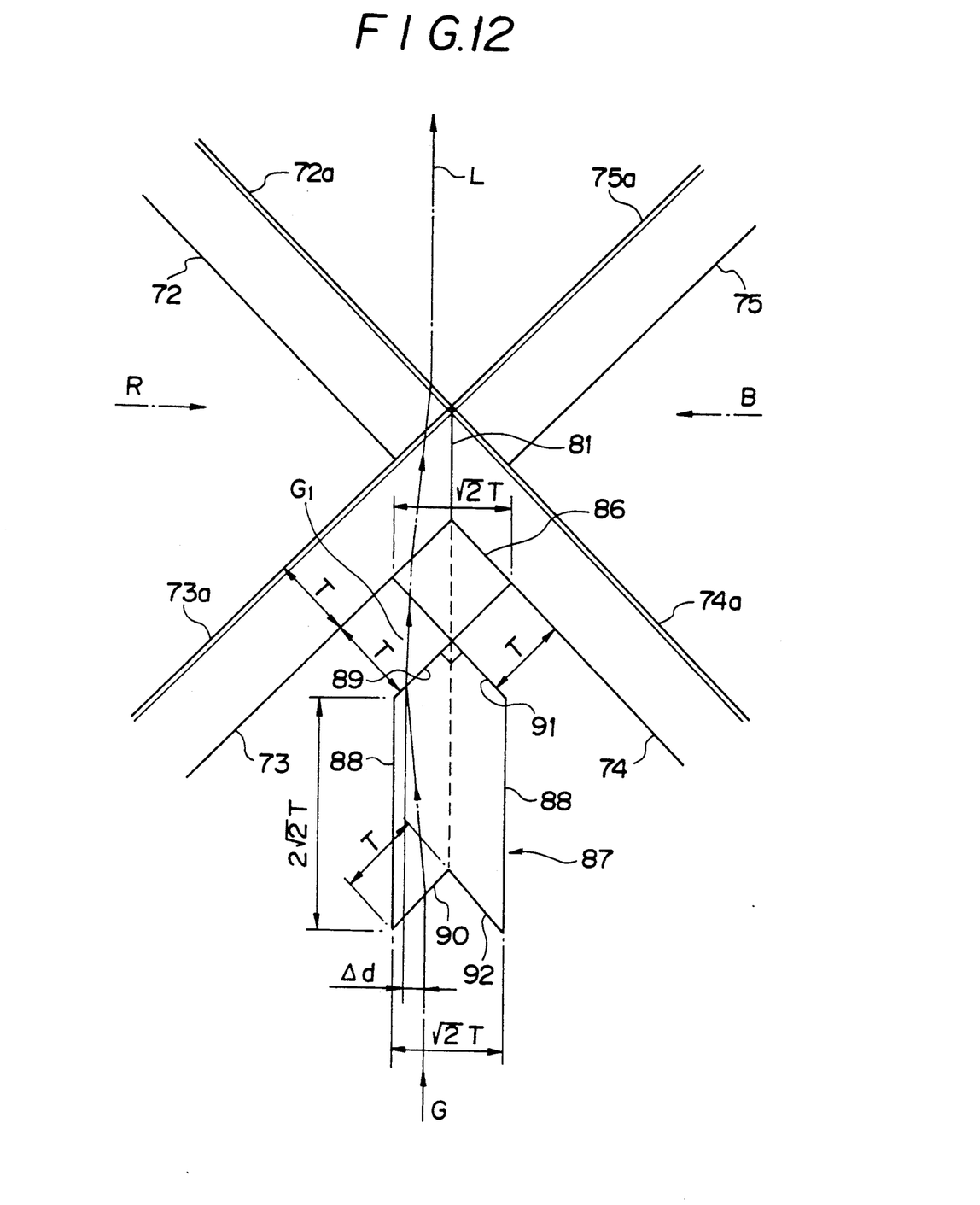
FIG. 12 is an enlarged top view of the joint of dichroic mirrors illustrating a third embodiment.

FIG. 12 shows a third embodiment which is a further improvement of the second embodiment. When the very small distance $\Delta d$ mentioned in the second embodiment causes a problem, a second correction prism 87 the horizontal section of which has a shape of the feather of an arrow is placed adjacent to the first correction prism 86 on the side thereof which a colored light is incident. The second correction prism 87 deviates the path of the light G having entered the joint portion 81 in the lateral direction (left direction in FIG. 12) by the distance $\Delta d$, so that the emitted light L is aligned with the light G. The second correction prism 87 is fixed to the supporting base 80. The prism has six sides 88, 90, 92, 88, 91 and 89, and the opposed sides 88 and 88, 89 and 90, 91 and 92 are in parallel, respectively. The sides 89, 90, 91 and 92 have a length of T, and the sides 89 and 91, and 90 and 92 are at right angles to each other, respectively. The length of the sides 88 is $2\sqrt{2}T$, and the width between the sides 88, 88 is $\sqrt{2}T$. The material and refractive index of the second correction prism 87 are the same as the first correction prism 86. A light $G_l$ emitted from the second correction prism 87 is parallel to the incident light G with the distance $\Delta d$ therebetween. The light $G_l$ emitted from the second correction prism 87 enters the first correction prism 86 and then the dichroic mirror 72, and the light L emitted from the mirror 72 is deviated reversely by the distance $\Delta d$, so that the emitted light L is aligned with the light G. With this device, the cause of ghost images is completely eliminated.

The three color separation/synthesis mirror device of this invention decreases appearance of stray rays, makes constant the refractive indexes and reduces out-of-focus images, resulting in improved contrast of an image. The second and third embodiments may provide the same effect as the first embodiment in addition, by making the same notch as the first embodiment in the correction prisms 86 and 87 at the portions indicated by dotted lines in FIGS. 11 and 12, and filling it with the same transparent adhesive as the first embodiment, which has a higher refractive index than the prisms 86 and 87.

The three color separation/synthesis mirror device of this invention may be used for CRT projectors, as well as liquid crystal projectors. If reversing incidence and projection, the device of this invention may also be employed for a three color separation cameras. The device may be used as a one colored light input/output device, applying three primary colors.

In all the above embodiments, the dichroic mirrors are soaked in a liquid. However, the device provides sufficiently improved features without the liquid.

When a reference number is used in several different figures, the number represent the same or equivalent part.

As the three color separation/synthesis mirror device according to this invention is structured as mentioned above, it greatly improves the image quality compared with conventional devices. Particularly, the device causes no double images, out-of-focus images or unclear images at the central portion of a screen which is a cross point, and prevents number of scanning lines from decreasing.

What is claimed is:

1. A three color separation/synthesis mirror device comprising a housing; four dichroic mirrors installed in the housing, crossing each other forming an X-shape and having a V-shaped notch in a joint portion of two of the four mirrors; and a transparent adhesive with a higher refractive index than that of the dichroic mirrors filling the notch.

2. A three color separation/synthesis mirror device according to claim 1, wherein said housing is filled with a liquid whose refractive index is smaller than that of the dichroic mirrors.

3. A three color separation/synthesis mirror device according to claim 2, wherein said liquid is a mixture of glycerine and ethylene glycol.

4. A three color separation/synthesis mirror device comprising a housing; four dichroic mirrors installed in the housing and crossing each other forming an X-shape; and a first correction prism disposed adjacent to a joint portion of the dichroic mirrors at one side of the joint portion to which an incident light is inputted, said first correction prism causing emitted light from the joint portion to be in parallel with the incident light.

5. A three color separation/synthesis mirror device according to claim 4, wherein the device further comprises a second correction prism disposed adjacent to the first correction prism at one side of the first correction prism to which the incident light is inputted, for aligning the emitted light from the joint portion with the incident light.

6. A three color separation/synthesis mirror device according to claim 4, wherein said housing is filled with a liquid whose refractive index is smaller than that of the dichroic mirrors.

7. A three color separation/synthesis mirror device according to claim 6, wherein said liquid is a mixture of glycerine and ethylene glycol.

8. A three color separation/synthesis mirror device comprising a housing; four dichroic mirrors installed in the housing, crossing each other forming an x-shape and having a V-shaped notch in a joint portion of two of the four mirrors; a transparent adhesive with a higher refractive than that of the dichroic mirrors filling the notch; and a first correction prism disposed adjacent to a joint portion of the dichroic mirrors at one side of the joint portion to which an incident light is inputted said first correction prism causing emitted light from the joint portion to be in parallel with the incident light.

9. A three color separation/synthesis mirror device comprising a housing; four dichroic mirrors installed in the housing, crossing each other forming an X-shape and having a V-shaped notch in a joint portion of two of the four mirrors; a transparent adhesive with a higher refractive index than that of the dichroic mirrors filling the notch; a first correction prism disposed adjacent to a joint portion of the dichroic mirrors at one side of the joint portion to which an incident light is inputted, said first correction prism causing emitted light from the joint portion to be in parallel with the incident light; and a second correction prism disposed adjacent to the first correction prism for aligning the emitted light from the joint portion with the incident light.

* * * * *